United States Patent [19]
Gracy

[11] Patent Number: 6,076,614
[45] Date of Patent: Jun. 20, 2000

[54] SOIL TILLING IMPLEMENT WITH NOVEL TINE AND FOOTREST STRUCTURE

[76] Inventor: Mark S. Gracy, 1140 Queensbury St., Pgh, Pa. 15205

[21] Appl. No.: 09/349,696

[22] Filed: Jul. 8, 1999

Related U.S. Application Data

[60] Provisional application No. 60/093,443, Jul. 16, 1998.
[51] Int. Cl.[7] .................................................. A01B 1/18
[52] U.S. Cl. ........................... 172/379; 172/382; 294/49
[58] Field of Search .................................. 172/379, 378, 172/375, 382; 294/52, 60, 120, 125, 49

[56] References Cited

U.S. PATENT DOCUMENTS

| | | | |
|---|---|---|---|
| 162,457 | 4/1875 | Bishop et al. | 294/52 |
| 177,498 | 5/1876 | Gebhardt | 294/52 |
| 698,715 | 4/1902 | Knight | 172/378 X |
| 722,028 | 3/1903 | Lubin | 172/379 X |
| 870,955 | 11/1907 | Hazzard | 294/60 X |
| 2,504,715 | 4/1950 | Meyers | 294/52 X |
| 2,791,879 | 5/1957 | Truran | 172/378 |
| 2,852,996 | 9/1958 | Meyer | 172/378 |
| 3,221,485 | 12/1965 | Jenkins | 294/52 X |
| 4,674,786 | 6/1987 | Lynch | 294/120 |
| 5,360,071 | 11/1994 | Bergendorf | 172/378 |
| 5,706,900 | 1/1998 | Liao | 172/378 |
| 5,871,058 | 2/1999 | Naccarato et al. | 172/378 |

FOREIGN PATENT DOCUMENTS

| | | | |
|---|---|---|---|
| 3317004 | 11/1984 | Germany | 172/379 |
| 95617 | 7/1922 | Switzerland | 172/379 |

OTHER PUBLICATIONS

Leverage Digger Inc. Leverage Digger™ Brochure, Date unknown.

*Primary Examiner*—Christopher J. Novosad
*Attorney, Agent, or Firm*—J. Stewart Brams

[57] ABSTRACT

A dirt-loosening tool comprising of an elongated handle having a head at one end that has multiple prongs in separate planes that can be easily pushed into soil. A footrest deposed between the separate planes doubles as a leveraged fulcrum. This allows for effortless cultivation of compacted dirt.

9 Claims, 2 Drawing Sheets

SOIL TILLING IMPLEMENT WITH NOVEL TINE AND FOOTREST STRUCTURE

This application claims benefit of Provisional Appl. No. 60/093,443 filed Jul. 16, 1998.

BACKGROUND OF THE INVENTION

1. Field of the Invention

The present invention relates to gardening tools, particularly to tools used for loosening and or tilling the ground to prepare the soil for planting.

2. Description of the Related Art

Shovels, spades, and picks are currently used by gardeners to break up and loosen soil in preparation for planting. These tools will separate out generally planar portions of soil, and are generally not very efficient in breaking up and loosening the ground. Penetration of these tools into the ground is difficult requiring much effort. Attempting to aid penetration of a shovel into the ground by applying the users' weight on the blade head can be difficult because of a small foot rest area and an unstable base. Alternatively, motorized ground tilling machinery can be used, but this solution is not suitable for small projects because of the expensive and cumbersome equipment involved.

Leverage Digger Inc. shows an example of a garden tool that attempts to address the problem of having a larger foot rest area in the sales brochure of the Leverage Digger™. However this tool has all of its tines in a straight row like a typical pitchfork. This tool will separate out generally planar portions of soil, and would not be very efficient in breaking up and loosening the ground. Also this tool does not address a problem of being unstable when the user places their body weight on the tool. If a stone or uneven compacted soil is encountered the tool could cause the user to loose their balance. When body weight is placed on the foot rest area the handle can be forced abruptly toward the user. This could cause injury to the user.

It is therefore an object of the present invention to provide a stable platform for the user to use when transferring body weight to the tool.

Another object of the present invention is to more efficiently break up and loosen soil.

SUMMARY OF THE INVENTION

The dirt loosening of the present invention includes a handle having a head at one end. The head comprises two parallel first prongs, and two parallel second prongs. The first prongs occupy a common first plane, and the second prongs occupy a common second plane, which is parallel to and spaced apart from the first plane. The head further comprises a footrest disposed between the first and second prongs, upon which a user may place his or her foot, transferring their body weight, to help to drive the head into the ground.

Because the first prongs are spaced apart from the second prongs, greater ground breaking and loosening occurs than with conventional shovels and spades.

Still further features and advantages will become apparent from the ensuing description and drawings.

DETAILED DESCRIPTION

Figure 1:
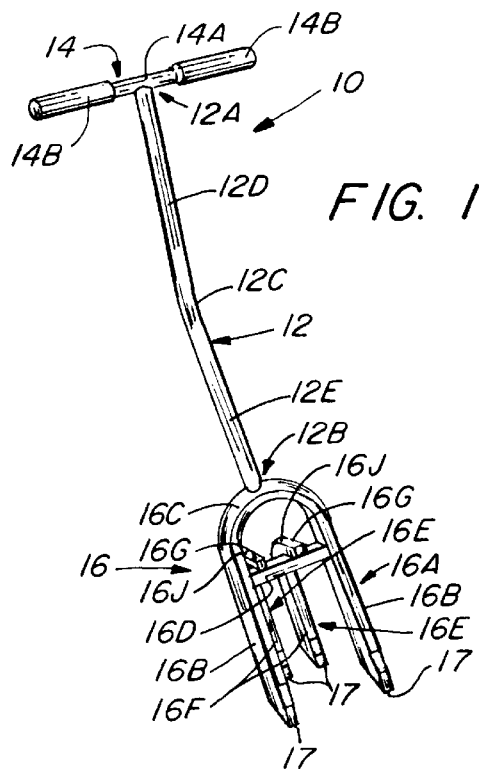
FIG. 1 is a perspective view of a dirt-loosening tool of the present invention.
Figure 2:
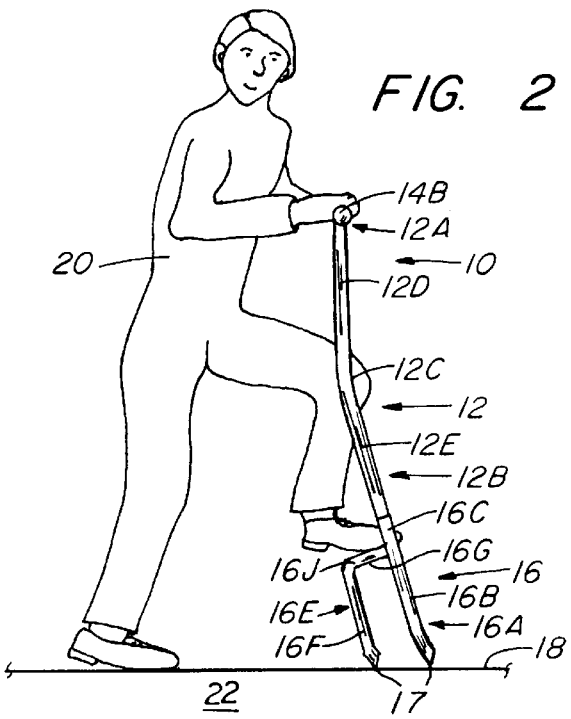
FIG. 2 is a side elevational view of the dirt-loosening tool in use.
Figure 3:
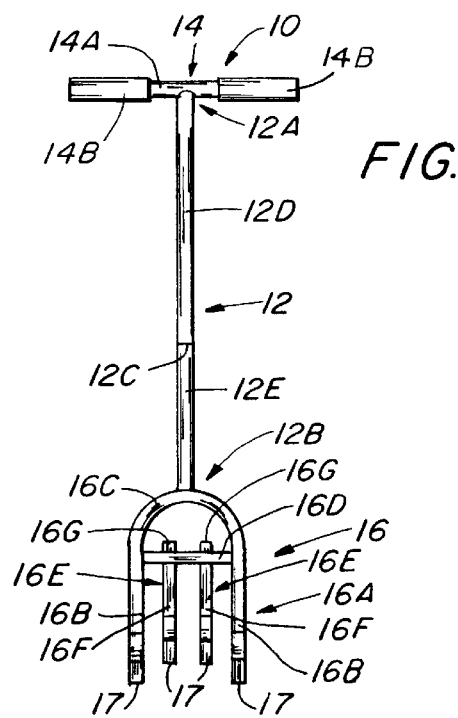
FIG. 3 is a front elevational view of the dirt-loosening tool.

FIG. 1 is a perspective view of a dirt-loosening tool 10. FIG. 2 is a side elevational view of the dirt-loosening tool 10 in use. FIG. 3 is a front elevational view of the dirt-loosening tool 10. Referring to FIGS. 1–3, the tool 10 comprises a handle 12 having a first end 12A and a second end 12B. A grip means 14 is disposed at the first end 12A, and a head 16 is disposed at the second end 12B.

The handle 12 has a bend 12C between the first and second ends 12A, 12B. Thus, the handle 12 forms a straight first portion 12D extending between the first end 12A and the bend 12C, and a straight second portion 12E extending between the bend 12C and the second end 12B. The handle 12 is generally pipe shaped, although other shapes would be within the scope of the invention.

The grip means 14 comprises a generally pipe shaped elongated member 14A which is perpendicular to the first portion 12D of the handle 12, and which includes rubber grips 14B at each end of the elongated member 14A. The first end 12A of the handle 12 connects to the elongated member 14A generally at a center of the elongated member 14A.

The head 16 comprises a generally U-shaped main head member 16A forming two parallel first prongs 16B. The second end 12B of the handle 12 connects to the main head member 16A at a center of the arcuate portion 16C of the main head member 16A.

A crossbar 16D spans between the first prongs 16B near the arcuate portion 16C of the main head member 16A.

Longitudinal axes of the first prongs 16A and the second portion 12E of the handle 12 generally reside in a common first plane.

The head 16 further comprises two generally L-shaped secondary members 16E. Each of the secondary members 16E comprises a second prong 16F having a short leg 16G extending generally perpendicularly from a bend 16J at one end thereof.

The short legs 16G are each attached at distal ends thereof to the cross-bar 16D, and are oriented generally perpendicularly to the cross-bar 16D and to the second portion 12E of the handle 12. The second prongs 16F are positioned parallel to each other and to the first prongs 16B. Longitudinal axes of the second prongs 16F generally reside in a common second plane which is parallel to and spaced apart from the first plane.

The second prongs 16F are bent near their distal ends generally toward the first prongs 16B. The first prongs 16F are bent near their distal ends generally away from the second prongs 16F.

The distal ends of the first and second prongs 16B, 16F are each tapered to an edge 17 to provide easier penetration into the ground.

FIG. 2 shows the tool 10 in use. Initially, the tool 10 is held by the grips 14B with the first portion 12D of the handle 12 generally perpendicular to grade 18, as shown in FIG. 2. The short legs 16G of the secondary members 16E form a foot rest upon which the user 20 places his foot, to urge the first and second prongs 16B, 16F generally downward through the grade 18 into the ground 22.

The head 16 is configured such that when the distal ends of the first and second prongs 16B, 16F are resting on grade 18, the longitudinal axes of the first and second prongs 16B, 16F form a non-perpendicular angle with respect to grade 18, and the first portion 12D of the handle 12 is generally perpendicular to grade.

Maintaining the orientation of the tool 10 with the grade 18 just described, the user 20 presses on the short legs 16G with his foot, driving the head 16 into the ground 22, generally until the bends 16J in the secondary members 16E reach grade 18. The user 20 then pulls the handle 12 rearward to loosen the ground 22 between the first and second prongs 16B, 16F, using the bends 16J urged against grade 18 as a fulcrum. The user 20 may also rock the handle 12 forward and backward to further loosen the ground 22 between the first and second prongs 16B, 16F, using the bends 16J urged against grade 18 as a fulcrum.

The user 20 may also wish to twist the head 16 within the ground 22, by twisting handle 12 generally about the longitudinal axis of the first portion 12D of the handle 12, using the grip means 14. This will further loosen the ground 22.

The user 20 may also wish to repeatedly raise and lower the tool 10 so that the edges 17 of the first and second prongs 16B, 16F further break up the ground 22.

Because the first and second prongs 16B, 16F reside in different planes, greater ground breaking and loosening occurs than with conventional shovels and spades. Ground 22 is broken not only between the two first prongs 16B and between the two second prongs 16F, but also between the first and second prongs 16B, 16F.

Figure 4:
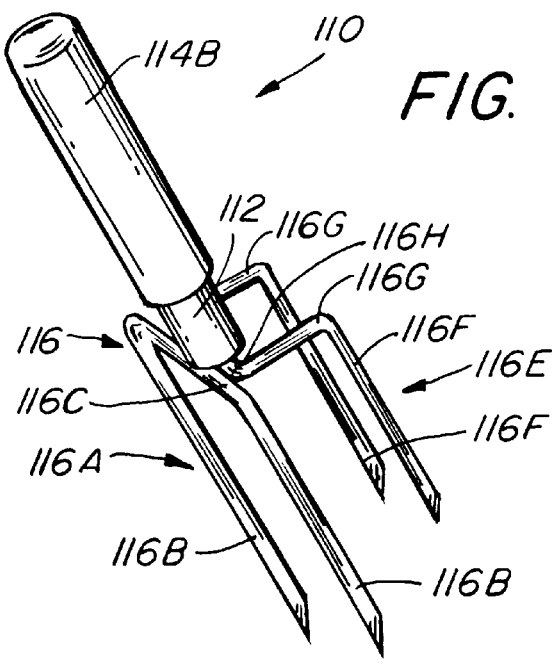
FIG. 4 is a perspective view of an alternative embodiment of the dirt-loosening tool.
Figure 5:
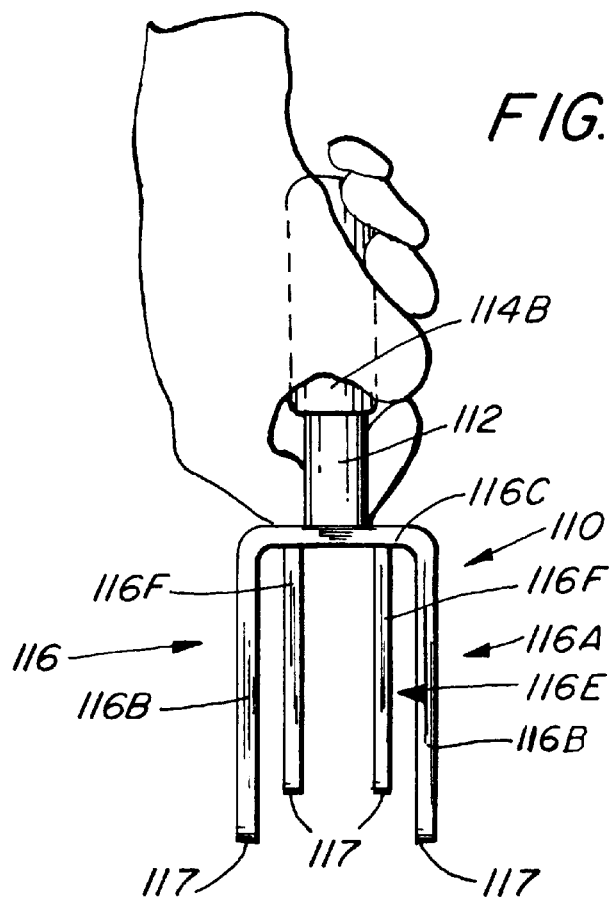
FIG. 5 is a front elevational view of the alternative embodiment of the dirt-loosening tool.

FIG. 4 is a perspective view of an alternative embodiment of the dirt-loosening tool 110. FIG. 5 is a front elevational view of the dirt-loosening tool 110. A human hand is shown holding the tool 110 in FIG. 5 to show the general size of the tool 110.

The tool 110 comprises a straight tubular handle 112 having a rubber grip 114B. A head 116 is connected to one end of the handle 112. The head 116 comprises a generally U-shaped main head member 116A having two parallel first prongs 116B and a straight connecting member 116C. The handle 112 is connected to a center of the connecting 116C. Longitudinal axes of the first prongs 116B lie in a common first plane, and are generally parallel to the handle 12.

Two generally L-shaped secondary members 116E each comprise a second prong 116F and a short leg 116G extending generally perpendicularly from one end of the second prong 116F. Distal ends of the short legs 116G are connected to a second connecting member 116H. The short legs 116G are oriented generally perpendicularly to the handle 112.

The connecting member 116C and the second connecting member 116H are parallel and adjacent to each other. The handle 112 is fixedly connected to the centers of the connecting member 116C and the second connecting member 116H. Longitudinal axes of the second prongs 116F are parallel to each other and lie in a common second plane which is parallel to and spaced apart from the first plane.

The distal ends of the first and second prongs 116B, 116F are each tapered to an edge 117 to provide easier penetration into the ground.

The tool 110 is used in a similar manner to the tool 10, by pushing the head 116 into the ground, rocking the handle 112 back and forth, and lifting the head 116 out of the ground.

The foregoing description is included to describe embodiments of the present invention, which include the preferred embodiment, and is not meant to limit the scope of the invention. From the foregoing description, many variations will be apparent to those skilled in the art that would be encompassed by the spirit and scope of the invention. For example, and not by way of limitation: the prongs may be bent differently or not at all; the number of prongs could vary; the handle of the first embodiment could be straight; the grip means could be configured differently; and the configuration of the head may vary from that which is described herein.

What is claimed is:

1. A soil tilling implement comprising:
   an elongated, upstanding handle;
   a rigid, unitary head fixed adjacent one end of said handle;
   Said head having a first set of spaced apart, elongated prongs disposed in a first plane, and a second set of spaced apart elongated prongs disposed in a second plane spaced from said first plane; and
   said head including an integrally formed footrest disposed intermediate said first and second planes.

2. The implement as set forth in claim 1 wherein the end of said elongated handle opposite said one end includes an elongated member extending transversely of the longitudinal extent of said handle.

3. The implement as set forth in claim 1 wherein said first set of prongs are spaced from one another at a given spacing, and said second set of prongs are spaced from one another at a spacing different from said given spacing.

4. The implement as set forth in claim 1 wherein said first and said second sets of prongs each consists of two prongs.

5. The implement as set forth in claim 4 wherein said prongs of said first set are spaced from one another at a given spacing, and said prongs of said second set are spaced from one another at a spacing different from said given spacing.

6. The implement as set forth in claim 5 wherein said footrest is disposed adjacent one end of said prongs of one of said first and second sets, and intermediate the ends of said prongs of the other of said sets of prongs.

7. The implement as set forth in claim 6 additionally including means adjacent one end of said other set of prongs rigidly fixing said head with respect to said handle.

8. The implement as set forth in claim 1 wherein said first and second planes are non-intersecting planes.

9. In an implement with a working head that forms a fork means for tilling the soil, said working head comprising:
   a first prong set formed as a generally U-shaped member with a pair of spaced apart legs disposed in a first plane and forming a pair of prongs;
   a cross-bar member extending between and integrally fixed to said spaced apart legs;
   a second set of elongated prongs fixed to said cross-bar member intermediate said spaced apart legs, said second set of prongs being formed by a plurality of generally L-shaped members each having one end thereof integrally fixed to said cross-bar member and the other end thereof extending generally in the same direction as said first set of prongs; and
   a portion of at least some of said L-shaped members forming a footrest intermediate said first and second sets of prongs.

* * * * *